(12) United States Patent
Love

(10) Patent No.: US 11,568,001 B2
(45) Date of Patent: Jan. 31, 2023

(54) RADIAL MAP DATA VISUALIZATION

(71) Applicant: Merck Sharp & Dohme LLC, Rahway, NJ (US)

(72) Inventor: Oriana Jeannette Love, Austin, TX (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 0 days.

(21) Appl. No.: 16/900,499

(22) Filed: Jun. 12, 2020

(65) Prior Publication Data

US 2020/0401628 A1    Dec. 24, 2020

Related U.S. Application Data

(60) Provisional application No. 62/865,188, filed on Jun. 22, 2019.

(51) Int. Cl.
*G06F 16/9038* (2019.01)
*G06F 17/18* (2006.01)
*G06F 3/04842* (2022.01)

(52) U.S. Cl.
CPC ...... *G06F 16/9038* (2019.01); *G06F 3/04842* (2013.01); *G06F 17/18* (2013.01)

(58) Field of Classification Search
CPC ..... G06F 16/9038; G06F 3/0482; G06F 17/18
USPC ........................................................ 707/722
See application file for complete search history.

(56) References Cited

U.S. PATENT DOCUMENTS

| | | | |
|---|---|---|---|
| 8,370,742 B2* | 2/2013 | Hieronymus | A01D 41/127 715/702 |
| 9,779,147 B1* | 10/2017 | Sherman | G06F 16/248 |
| 2008/0229245 A1* | 9/2008 | Ulerich | G06F 3/0482 715/834 |
| 2010/0251179 A1* | 9/2010 | Cragun | G06F 3/0482 715/834 |
| 2011/0066981 A1* | 3/2011 | Chmielewski | G06F 3/0482 715/834 |
| 2012/0036434 A1* | 2/2012 | Oberstein | G06F 3/0482 715/702 |
| 2012/0105471 A1* | 5/2012 | Ford | G16Z 99/00 345/619 |
| 2013/0346844 A1* | 12/2013 | Graepel | G06F 40/226 715/219 |
| 2015/0229532 A1* | 8/2015 | Somaiya | H04L 43/0823 715/736 |
| 2016/0259491 A1* | 9/2016 | Jacobs | H04W 4/00 |

(Continued)

*Primary Examiner* — William D Titcomb
(74) *Attorney, Agent, or Firm* — Fenwick & West LLP

(57) ABSTRACT

A visualization system generates for display one or more radial maps that represent data values for a plurality of parameters measured for groups of entities. Each group of rows of the radial map represents a group of entities for whom the parameters are measured and compared against a baseline or control group, while each column represents a measured parameter. If the visualization system determines that an entity has a data value for a measured parameter that deviates from the control group value by more than a threshold amount, the system visually distinguishes the outlier value from the other geometric shapes in the radial map. Additionally, two or more radial maps may be simultaneously displayed on a visual interface based on correlations between data points for groups of entities.

19 Claims, 9 Drawing Sheets

(56) References Cited

U.S. PATENT DOCUMENTS

| | | | | |
|---|---|---|---|---|
| 2016/0335787 A1* | 11/2016 | Martin | .................. | G06F 11/328 |
| 2017/0046860 A1* | 2/2017 | Barosi | .................. | G06Q 10/067 |
| 2017/0212668 A1* | 7/2017 | Shah | .................. | G06F 3/04847 |
| 2018/0348998 A1* | 12/2018 | Mueller | .................. | G06N 5/022 |
| 2019/0155815 A1* | 5/2019 | Austin | .................... | G06F 16/00 |
| 2019/0392351 A1* | 12/2019 | Zuluaga | .................. | G06F 17/18 |
| 2020/0026791 A1* | 1/2020 | Love | ....................... | G06F 16/26 |
| 2020/0401628 A1* | 12/2020 | Love | .................. | G06F 16/9038 |

* cited by examiner

RADIAL MAP DATA VISUALIZATION

CROSS REFERENCE TO RELATED APPLICATIONS

This application claims the benefit of U.S. Provisional Application No. 62/865,188, filed Jun. 22, 2019 which is incorporated by reference in its entirety.

BACKGROUND

1. Technical Field

The subject matter described generally relates to the field of generating visualizations of data sets.

2. Background Information

Comparing data against a baseline or reference point is one of the most basic analytic tasks: average temperature this year versus all previous years, number of continuous tornadoes this year versus all time, and other events whose data can be compared over a suitable unit of measurement (e.g., time or distance). For these comparisons, bar charts and pie charts are often sufficient. However, when the data is multi-dimensional, the same visualization techniques often fall short. For example, how would one present the comparison of all the days of sunshine per a week within each state within the US, compared with the last 50 years and the average of all those years? In short, existing techniques are ineffective for presenting multi-dimensional data, particularly if the data includes complex or nuanced correlations between variables.

SUMMARY

Visualizing data using a radial map allows groups of entities to be easily identified by assigning them a common visual property. The radial map also allows outlier values to be highlighted by overriding the visual property assigned to the group. For example, in one embodiment, entities sharing a common characteristic are identified using a common color and outlier values for variables are identified by changing the color of a representation associated with the variables having outlier values.

Each row of data corresponds to an entity (e.g., an individual, place, legal person, etc.) and is displayed in a ring of the radial map (also referred to as a "row"). Each column (also referred to as a "spoke") of the radial map represents a parameter of the data being compared amongst the entities. Thus, the intersection of a row and a column is a cell (such as a geometric shape) that represents the value of the parameter corresponding to the column for the entity corresponding to the row. In various embodiments, the rings of the radial map are binned into groups, with the first group representing a baseline or control data. The baseline may be an individual instance or set of instances or an aggregated value. The remaining rows may be compared to this baseline, and applied visual attribute of a cell (e.g., the color of the cell) may be changed if the value for the associated cell deviates by more than a threshold amount from the baseline. A user may interact with the radial map to view additional detail and relationships by selecting radial rings or spokes of the visualization. Additionally, in some embodiments, multiple radial maps are displayed on the same screen, and user interaction with one radial map may cause display of correlated data in the other radial map.

DETAILED DESCRIPTION

The Figures (FIGS.) and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality.

Example Systems

Figure 1:
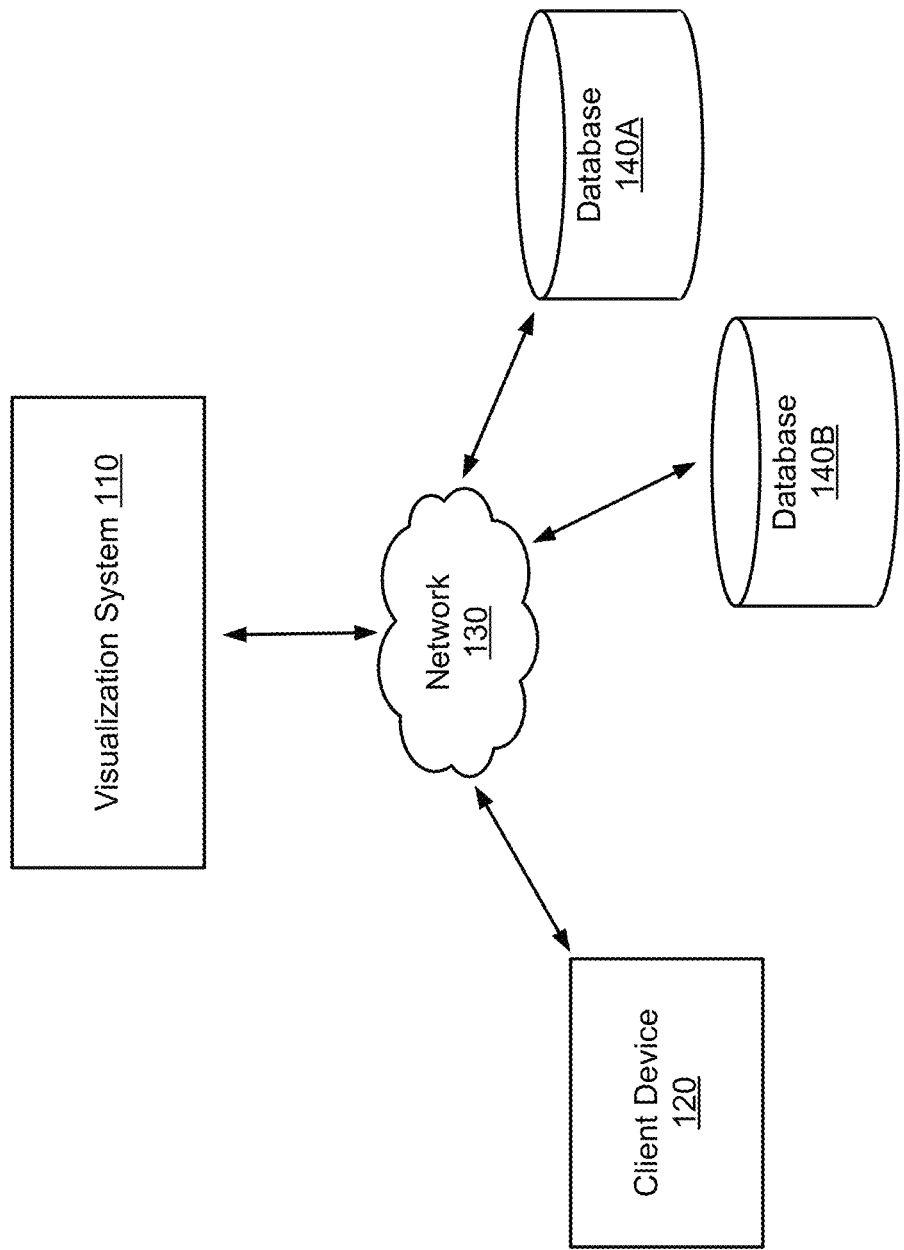
FIG. 1 illustrates an example computer system environment in which the techniques described may be practiced, according to one embodiment.

FIG. 1 illustrates an example computer system environment in which the techniques described may be practiced, according to one embodiment. The computer system environment includes a visualization system 110, a client device 120, and two databases 140, which are connected to each other via a network 130. In other embodiments, different or additional entities can be included in the computer system environment. For example, though only one client device 120 is shown in FIG. 1, the computer system environment may include additional client devices 120. Furthermore, in various embodiments the visualization system 110 may be incorporated partially or entirely into the client device 120. The functions performed by the various entities of FIG. 1 may vary in different embodiments.

The visualization system 110 generates data visualizations to visualize datasets using radial maps that apply distinguishing visual characteristics to identify outlier values. In one embodiment, the radial maps have rings corresponding to entities and spokes corresponding to parameters for the entities. Thus, a cell at the intersection of a spoke and ring indicates the value of the parameter corresponding to the spoke for the entity corresponding to the ring. A visual attribute of the cell is updated if the value of the corresponding parameter meets one or more criteria for being an outlier relative to the dataset as a whole or relative to measured data values for a control group. Depending upon the embodiment, the visualization system 110 may also generate user interfaces and analyze data. Various embodiments of the visualization system 110 are described in greater detail below, with reference to FIG. 2.

Each client device 120 includes one or more computing devices capable of processing data as well as transmitting and receiving data over a network 130. For example, a client device 120 may be a desktop computer, a laptop computer, a mobile phone, a tablet computing device, an Internet of Things (IoT) device, or any other device having computing and data communication capabilities. Each client device 120 includes a processor for manipulating and processing data and a storage medium for storing data and program instructions associated with various applications. The storage medium may include both volatile memory (e.g., random access memory) and non-volatile storage memory such as hard disks, flash memory, and external memory storage devices. Each client device 120 may further include or be associated with a visual interface capable of displaying user interfaces and data visualizations, depending upon the embodiment. The visual interface may display user interfaces and data visualizations directly (e.g., on a screen) or indirectly on a surface, window, or the like (e.g., via a visual projection unit). For ease of discussion, the visual interface may be described as a display. However, this should be understood to include other types of interface, such as projectors.

Each database 140 may be one or more relational or non-relational databases which store data (e.g., health records) and are communicatively connected to the network 130. Alternatively, instead of being communicatively connected to the network 130, the one or more databases are part of the visualization system 110. Although the term database is used, is some embodiments, some or all of the data may be stored in other manners. In the example of FIG. 1, database 140A and database 140B are discrete databases, such as the databases of two unrelated hospitals. Each may use a different database schema. For example, database 140A may encode a patient's state of residence in a column "State" while database 140B may encode the same concept in a column "ST" that uses state abbreviations rather than full names. In some embodiments, the visualization system 110 can identify these columns as pertaining to a similar concept and treat them as a single column.

The network 130 may comprise any combination of local area and wide area networks employing wired or wireless communication links. In one embodiment, network 130 uses standard communications technologies and protocols. For example, network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

Figure 2:
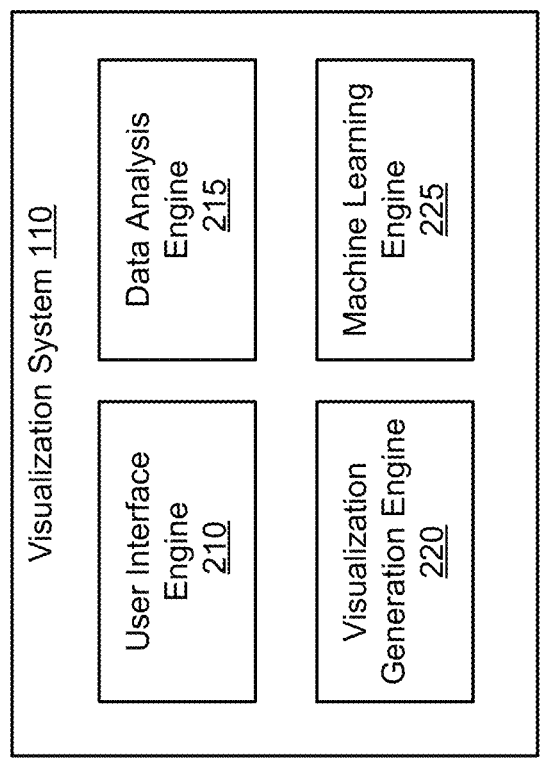
FIG. 2 is a block diagram of a visualization system, according to one embodiment.

FIG. 2 is a block diagram of the visualization system 110, according to one embodiment. In the embodiment shown, the visualization system 110 includes a user interface engine 210, a data analysis engine 215, and a visualization generation engine 220. In other embodiments the visualization system 110 may include fewer, other, or additional components which may perform functionality other than that described herein. For example, in various embodiments the visualization system 110 may include one or more databases to store data, such as various machine learning models.

The user interface engine 210 generates user interfaces for updating or interacting with databases and visualizations. In particular, the user interface engine 210 may provide user interfaces for display via a client application executing on a client device 120 of a user (e.g., a data owner or administrator). For example, the user may use the client device 120 to interact with one or more user interfaces to select a data set and initiate generation of a visualization, and to view and interact with the generated visualization. The user interface engine 210 can send information such as user input received at the visualization system 110 to the data analysis engine 215, and similarly can receive information such as visualizations from the visualization generation engine 220 to send to client devices 120 for display.

The data analysis engine 215 ingests data from one or more databases 140 and prepares it for use in generating a visualization. For example, the data analysis engine 215 may format the ingested data, store it in a particular data structure, determine concepts within the data—including concepts across the databases 140 and hierarchies among those concepts, and so on. The hierarchy may be user-created, determined using machine learning techniques, or generated with a combination of both techniques. For example, the user may input a concept hierarchy to the visualization system 110 for use in generating a visualization, or a concept hierarchy may be determined based on the various database schema of each source database.

The data analysis engine 215 further determines correlations between data points that may be used in generating the visualization. For example, a first entity might be associated with data points representing high measures of first and second parameters (e.g., an entity receiving a recommended dosage of a medication might have high measures of both mean platelet volume and white blood cell count). Responsive to the data analysis engine 215 determining that more than a threshold number of entities have similar measures of the first and second parameters, the data analysis engine 215 determines that a correlation exists between the first and second parameters. For example, at least a threshold number of location entities may have similar measures of weather-related parameters such as humidity, wind, and temperature. After determining this, the data analysis engine 215 then determines a correlation that exists between humidity, wind, temperature, or a combination thereof. One example of a correlation that could be determined from these similar parameters is that humidity and wind speed are inversely proportional. Another example of a correlation may be from parameters from clinical trials. The data analysis engine 215 determines that more than a threshold number of trial entities may have similar measures of parameters such as mean platelet volume and white blood cell count and therefore, that a correlation exists between the two parameters.

Correlations among parameters, in addition to or alternatively, may be pre-determined. The data analysis engine 215 may use previously determined correlations to establish correlations in subsequently received data. For example, the data analysis engine 215 previously determines a correlation between mean platelet volume and white blood cell count such that, in subsequently generated data visualizations, the two parameters are correlated automatically. In some embodiments, the data analysis engine 215 receives indications of pre-determined correlations from a source of the data or a third-party data analytics service.

In some embodiments, the correlations are determined using machine learning. Machine learning engine 225 may implement an unsupervised learning algorithm to identify correlations. Data from the databases 140A and 140B may be input into the machine learning engine 225 to determine an underlying distribution in the data values. The machine learning engine 225 may include one or more machine learning models. A machine learning model of the machine learning engine 225 is configured to receive, as input, data from an entity and output associations between portions of the data (e.g., correlations between parameters or cells). Although unsupervised learning is used as an example herein, correlations may be determined through any suitable machine learning model or combination of models. Machine learning models of the machine learning engine 225 may use various machine learning techniques such as k-means clustering, mixture models, linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm The visualization generation engine 220 generates visualizations of datasets, such as radial maps of health data from multiple databases. The visualization generation engine 220 receives data from the data analysis engine 215 and uses it to generate a visualization. The visualization may be formatted for display upon a client device 120, such as to fit a viewport of a client device 120 or to fit within a user interface that is generated via the user interface engine 210, and may be part of the user interface. In an embodiment, the visualization system 110 sends generated visualizations to client devices 120 for display.

In one embodiment, the visualization engine 220 generates visualizations of correlations between two or more measured parameters. If the data analysis engine 215 determines that a correlation exists between two or more parameters measured for the same group of entities, the visualization engine 220 generates a graphical representation of the correlation in the visualization. For example, the visualization engine 220 may generate two or more radial maps for display within a single viewport where each generated radial map includes a representation of at least one parameter correlated with at least one parameter of the other map. In one embodiment, user interaction with one displayed radial map causes the visualization engine 220 to highlight the one or more correlated parameters in the second radial map, as discussed below with respect to FIG. 8.

Data Visualization

Figure 3:
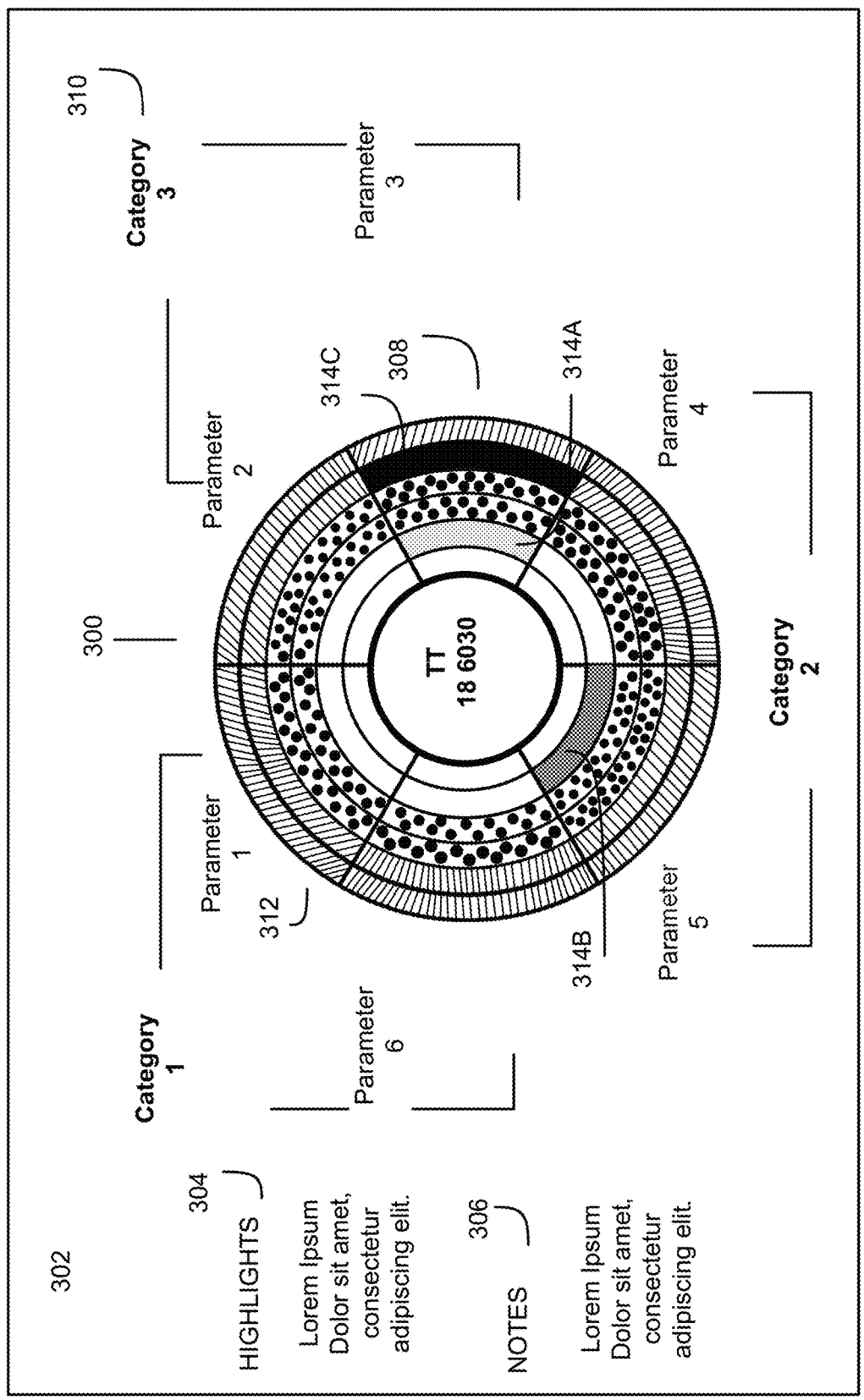
FIG. 3 is a simplified example of a radial map, according to one embodiment.

FIG. 3 is a simplified example of a radial map 300, according to one embodiment. The radial map 300 is within a viewport 302 of a visual interface. The viewport 302 is a region in which one or more radial maps is constrained. For example, the viewport 302 may map to a display screen of a client device 120. Depending upon the embodiment, the radial map 300 may be generated such that it fits entirely within the viewport 302, or may be generated as smaller than the viewport 302, as shown in FIG. 3. In the latter embodiment, additional information may be displayed in conjunction with the radial map 300, such as in a sidebar of the viewport 302. For example, as shown in FIG. 3, the additional information may include highlights 304 of the displayed radial map 300, notes 306 associated with one or more displayed cells, and the like.

The radial map 300 includes columns and rows arranged in a circular format and extending outward from a center point. While the embodiment shown in FIG. 3 includes six rows and six columns, in other implementations, the radial map 300 includes many more rows or columns (e.g., 50-100). In one embodiment, the center point includes identifying data associated with the radial map 300, such as the number of data points displayed in the radial map, a title of the radial map, a study number associated with the radial map, a summary of data points displayed in the radial map, or the like. Each column represents a parameter or property for which data is displayed and compared. For example, in the embodiment displayed in FIG. 3, the radial map 300 includes six parameters 308. Further, in some embodiments, the parameters 308 are batched into categories 310 that broadly summarize the parameters included in the category.

In one embodiment, each row of the radial map 300 represents an entity 312 and each group of one or more rows represents entities 312 having one or more common characteristics. Each group of rows may be visually distinguishable from the adjacent rows (e.g., based on color, pattern, or line bordering between groups). For example, if the radial map 300 is a visual analysis comparing groups of individuals taking a designated medication, a first row or first set of rows of the radial map 300 might represent individuals in a control group, such as healthy individuals who are not taking any medication. In the embodiment shown in FIG. 3, the control group is designated by no fill in the cells of the first and second row (i.e., the innermost two rows of the radial map 300). A second row or set of rows might represent individuals who are taking a recommended dosage of the medication. In the embodiment shown in FIG. 3, the second set of rows are designated by a dotted fill in the cells of the third and fourth rows. A third row or third set of rows might represent individuals taking a maximum recommended dosage of the medication. In the embodiment shown in FIG. 3, the third set of rows are designated by a diagonal hatching in cells of the fifth and sixth rows (i.e., the outermost two rows). While the displayed embodiment includes three groups of entities 312, in other embodiments, fewer or more groups of entities 312 may be displayed in the one or more radial maps 300.

Each cell 314 represents a data point representing the measure of the parameter 308 for an entity 312. For instance, in the example described above, each cell 314 represents the measure of a parameter for an individual taking the designated medication. In one embodiment, each cell 314 is displayed with the visual characteristic (e.g., the color or pattern) associated with the relevant group of entities 312 if the data value for the cell is within a given range for the group of entities 312. Conversely, cells 314 having outlier values for one or more parameters are highlighted in the radial map 300. For example, in one embodiment, if a data value for a first cell 314A deviates by more than a threshold amount from the control group of entities, the visualization system 110 overrides the visual property assigned to the group of entities 312 of which the cell 314A is a member and instead applies a different visual property (e.g., a different color or pattern) to the cell 314A. For example, in the embodiment shown in FIG. 3, the cell 314A has a light gray fill that distinguishes the cell 314A from the other cells in the first group of entities (i.e., the innermost two rows of the radial map 300). In some embodiments, different visual properties are assigned to the outlier cells 314 based on the amount of deviation from the control group of entities. For example, the cell 314B has a dark gray fill, and the cell 314C has a black fill, which might indicate that the entity represented by the cell 314B has a larger deviation for parameter 5 than for parameter 3 (cells 314A and 314B being in the same row and thus representing the same entity), and that the entity represented by the cell 314C has a still larger deviation for parameter 3. The color differentiation to distinguish amounts of deviation may use a range of colors that change from a first color corresponding to the lowest value to a second color corresponding to a highest value in increments (e.g., a heatmap).

Figure 4:
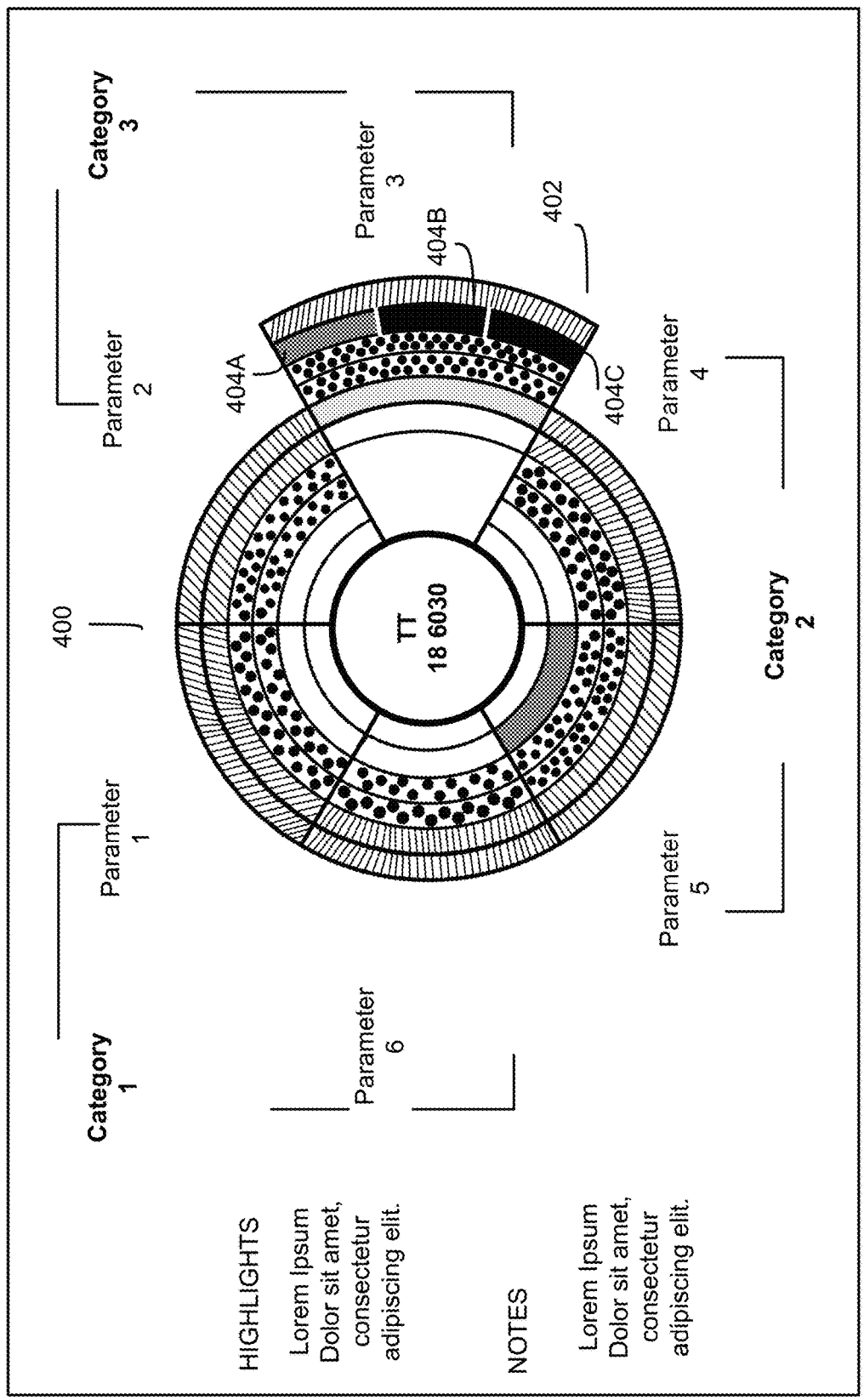
FIG. 4 is a simplified example of a radial map with a highlighted parameter, according to one embodiment.

FIG. 4 is a simplified example of a radial map 400 with a highlighted parameter 402, according to one embodiment. A user may interact with a column (e.g., by hovering over the column with a mouse or by tapping the column displayed on a touchscreen) to view additional information about the associated parameter 402 or the cells 422 for which the parameter 402 is measured. Alternatively, the visualization system 110 can detect user interaction with a column by detecting consecutive mouse movements across a column (or touches on a touchscreen), with a designated error ratio, implying that the user is interested in the parameter associated with that column. Although hover overs and selection of a particular portion of the interface are described as example interactions, an interaction may include any suitable indication that a user is interested in the data associated with the particular portion of the interface. For example, an interaction may include movement of a mouse towards the portion or a gaze on or towards the portion (i.e., determined through a gaze-tracking tool on a mobile device).

Depending upon the embodiment, a selected parameter 402 may be distinguished using any of a variety of graphical features, such as color, highlighting, pattern, or position of the parameter, and so on. For example, in the embodiment shown in FIG. 4, the highlighted parameter 402 appears to be "popped out" from the radial map 400. Cells associated with the selected parameter 402 may be displayed at the same radial width as other cells (i.e., cells associated with non-selected parameters) in the radial map 400, as shown in FIG. 4, at an increased radial width, or a combination thereof. Further interaction with the highlighted parameter 402 or a cell contained with the parameter 402 may further specify the data represented in the radial map 400 for records containing the particular distinct value represented by the parameter 402 or the cell that is interacted with, as discussed below with respect to FIG. 3.

In one embodiment, selection of a parameter causes display of additional data points for the selected parameter. For example, responsive to the user selecting the parameter 402, the visualization generation engine 220 generates and provides for display sub cells representing data values measured for the parameter 402 at specified time periods or upon occurrence of a specified event (e.g., when a dosage was received, when a sample was taken, etc.) For example, as shown in FIG. 3, the cell 314C is highlighted in black, indicating that the entity represented by the cell 314C has a value for parameter 3 that deviates from the control by a specified amount. Responsive to the user selecting the parameter 3 (i.e., the parameter 402 in FIG. 4), the visualization generation engine 220 provides for display additional data points for the entity associated with the cell 314C. For example, the data value displayed as the cell 314C in FIG. 3 is displayed as sub cells 404A, 404B, and 404C in FIG. 4, where each of the sub cells 404A, 404B, and 404C represents a data value measured for the parameter 402 at a specified time period. Alternatively, the visualization generation engine 220 may display sub cells responsive to a user selecting or hovering over the corresponding cell rather than the corresponding parameter of the sub cells. For example, a user may click on the group of data associated with parameter 402 and the display of the sub cells 404A-C is subsequently provided in response to the user hovering over any one of the cell 314C.

The data values of the additional data points may be displayed in various ways depending on a relative deviation of the data values, a user interaction with the cell or parameter, a state of the display, or any suitable cause for distinguishing the display of the data values. The sub cell 404A is highlighted in dark gray, indicating that the entity had values that deviated from the control by a second specified amount at a first time, while the sub cells 404 B and 404C are highlighted in black, indicating that the entity had values that deviated from the control by a third specified amount at second and third times. In some embodiments, therefore, user interaction with a parameter causes the radial map 400 to display an evolution of data points for the entity and the measured parameter. Further, in one embodiment, the collapsed state of the measured parameter is highlighted based on the average value of the parameter over the specified time periods. For example, the cell 314C is highlighted in black in FIG. 3, indicating that the average value for parameter 3 over the specified time periods is within a range of a third deviation from the control.

Figure 5:
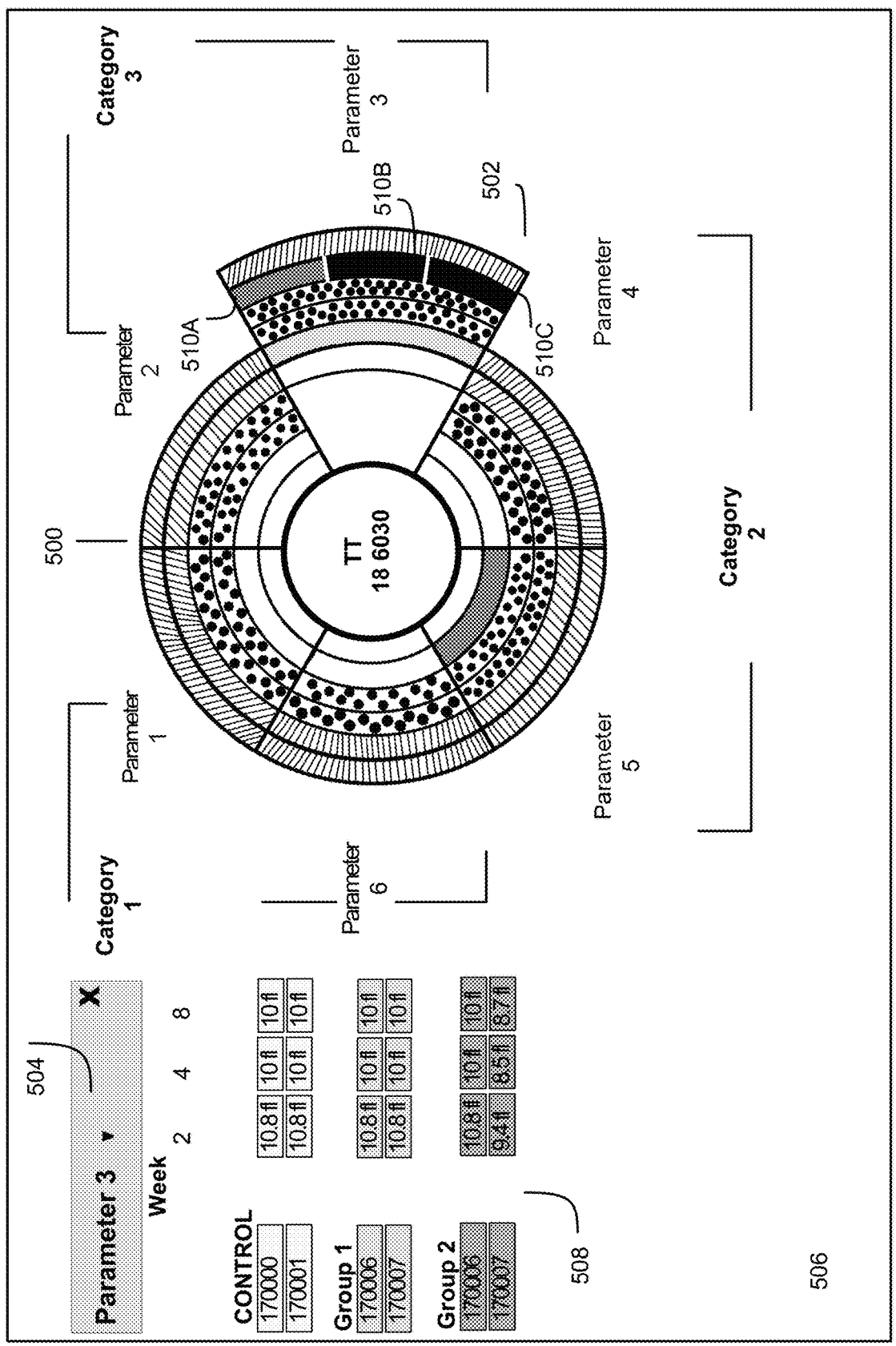
FIG. 5 is a simplified example of a radial map including data associated with the highlighted parameter, according to one embodiment.

FIG. 5 is a simplified example of a radial map 500 including data associated with the highlighted parameter 502, according to one embodiment. In one embodiment, if a user selects a parameter (e.g., by clicking on the column rather than simply hovering over it), the visualization system 110 generates a table 504 including data associated with the selected parameter 502 for display in the viewport 506. For example, if the user selects Parameter 3, the displayed table 504 might include Parameter 3 data values for entities in each of the groups of entities. The table may include a single value for each entity in each of the groups of entities or multiple data values, such as data values measured for Parameter 3 at specified time periods, for example, at weeks 2, 4, and 8, as represented in the table 504. In row 508, the entity identified as 170007 has a measured parameter value at week 2 of 9.4 fluid ounces, represented by the cell 510A, a measured parameter value at week 4 of 8.5 fluid ounces, represented by the cell 510B, and a measured parameter value at week 8 of 8.7 fluid ounces, represented by the cell 510C. The week 2 value for the measured parameter deviates from the control value for week 2 (10.8 fluid ounces) by a second specified amount and is therefore highlighted in dark gray in the radial map 500, while the week 4 and week 8 values deviate from the control values for week 4 and week 8 (10 fluid ounces) by a third specified amount and are therefore highlighted in black in the radial map 500.

Figure 6:
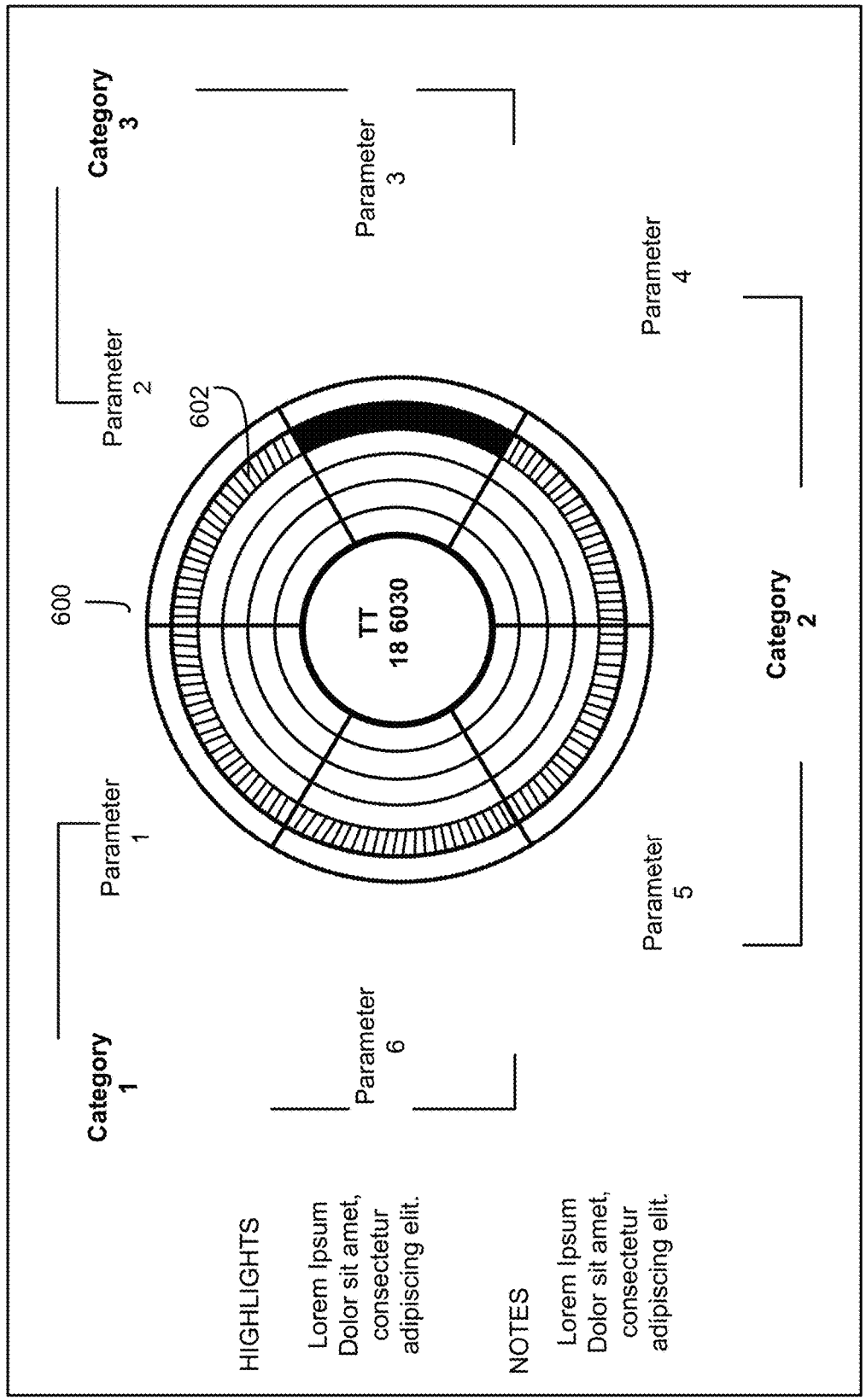
FIG. 6 is a simplified example of a radial map with a highlighted row, according to one embodiment.

FIG. 6 is a simplified example of a radial map 600 with a highlighted row 602, according to one embodiment. In one embodiment, a user may interact with a row (e.g., by hovering over the row) to view additional information about the associated entity for which the parameters are measured. Alternatively, the visualization system 110 can detect user interaction with a row based on consecutive mouse movements (or touches on a touchscreen) across row cells, with a designated error ratio, which suggests that the user is interested in that row. In one embodiment, labels for parameters for which the entity has outlier values, such as parameter 3 in FIG. 6, are visually distinguishable from the remaining parameters. The figure label may thus serve as a visual indicator to a viewing user that the entity 602 has an outlier values for the associated parameter.

Figure 7:
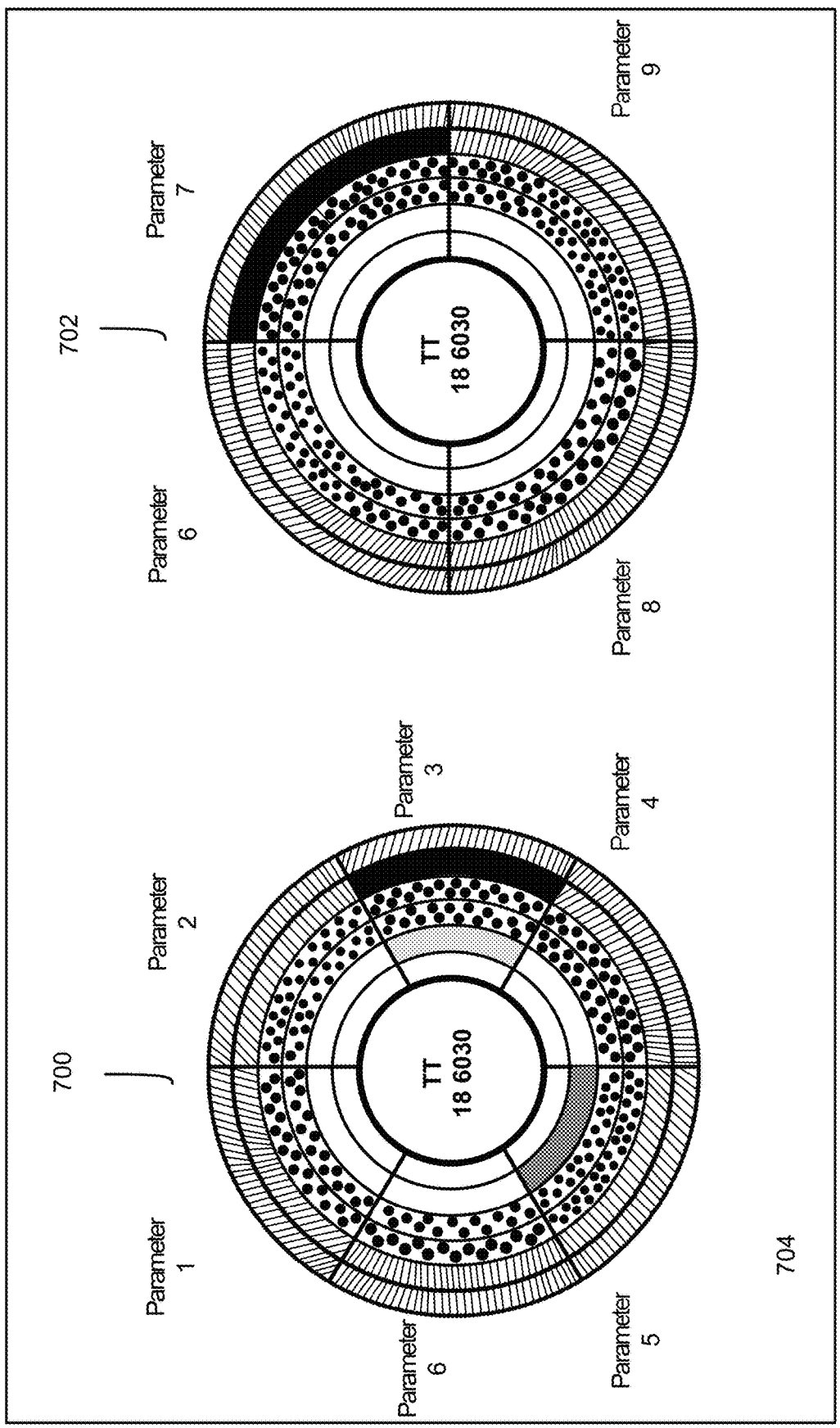
FIG. 7 is a simplified example of a data visualization showing multiple radial maps, according to one embodiment.

FIG. 7 is a simplified example of a data visualization showing multiple radial maps 700 and 702, according to one embodiment. Two or more radial maps, such as the radial maps 700 and 702 may be displayed simultaneously in a viewport 704. In one embodiment, the visualization system 110 generates radial maps for correlated data stored in one or more databases 140. For example, the radial maps 700 and 702 might be visualizations for records that measure different parameters for the same group of entities. For instance, in the embodiment shown in FIG. 7, the radial map 700 includes six parameters for three groups of entities, and the radial map 702 includes four parameters for the same groups of entities.

Figure 8:
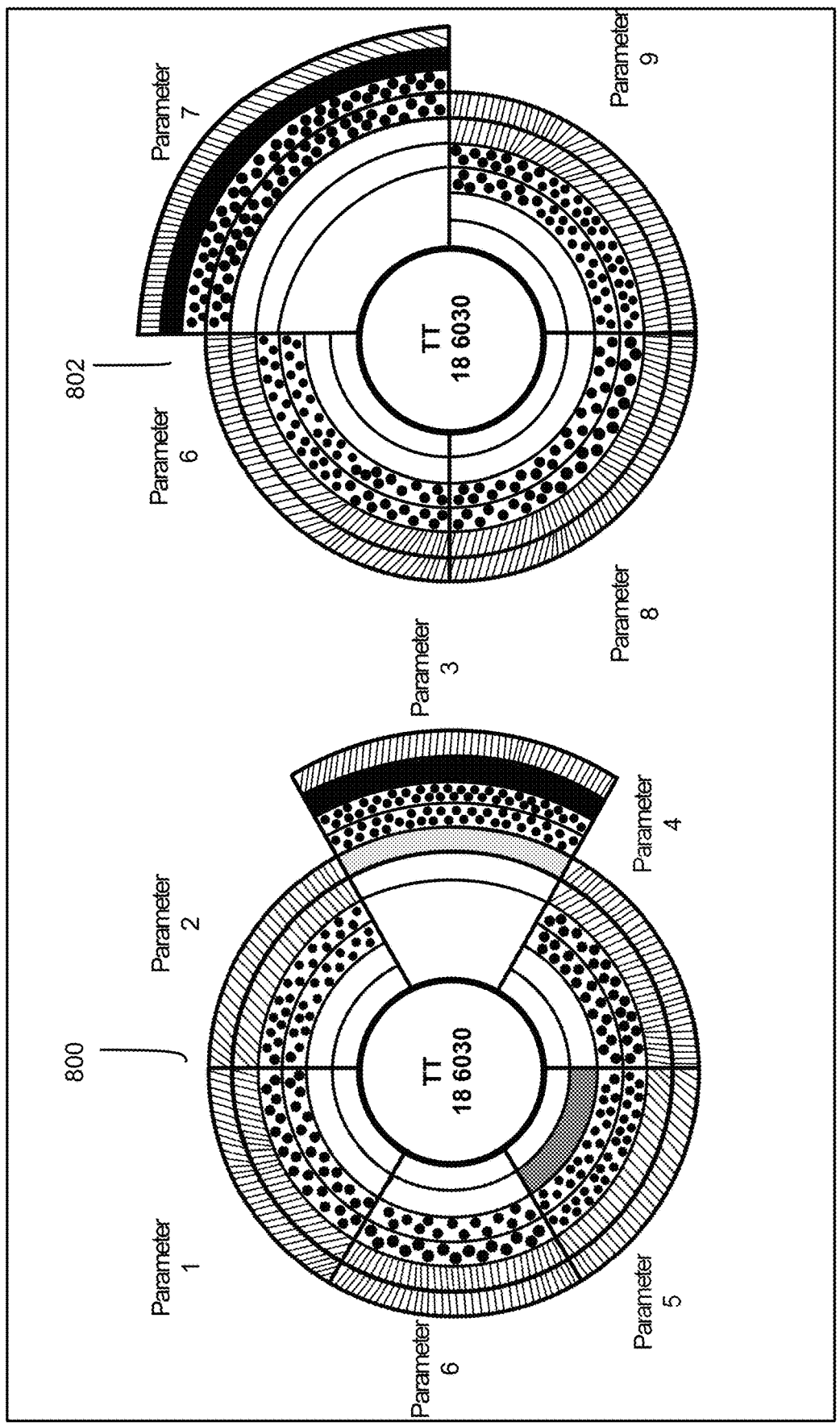
FIG. 8 is a simplified example of the data visualization of FIG. 7 in which interaction with a column of the first radial map causes display of correlated data in the second radial map, according to one embodiment.

FIG. 8 is a simplified example of the data visualization of FIG. 7 in which interaction with a portion of the first radial map causes display of correlated data in the second radial map, according to one embodiment. In one embodiment, when two or more radial maps 800 and 802 are displayed simultaneously in the viewport 804, user interaction with or selection of a column or row of one radial map (e.g., the radial map 800) causes the visualization system 110 to display correlated data in another displayed map (e.g., the radial map 802). The visualization system 110 may identify that parameter 7 of the radial map 802 is correlated with parameter 3 of radial map 800. After identifying this correlation, the visualization system 110 may visually distinguish a geometric shape in the radial map 802 corresponding to the correlated parameter 7. In some embodiments, the visualization system 110 may visually distinguish the correlated parameter 7 responsive to determining that parameter 3 is an outlier among parameters in the radial map 800 and identifying this correlation.

Additionally, the visualization system 110 may, responsive to a user selection or automatically, display correlated data within the same radial map. For example, if parameter 5 of the radial map 800 was determined by the data analysis engine 215 to be correlated with parameter 3, the visualization system 110 may visually distinguish parameter 5 in coordination with visually distinguishing parameter 3. The visualization system 110 may determine to visually distinguish correlated parameter 5 under various conditions. For example, correlated parameter 5 is visually distinguished in coordination with parameter 3 if parameter 5 has a threshold number of outliers in the corresponding data, if parameter 3 has a threshold amount of outliers, or a combination thereof. Although parameter 5 is used as an example to be visually distinguished, one or more cells within the parameter may be visually distinguished without visually distinguishing the entire parameter.

Example Computing System

Figure 9:
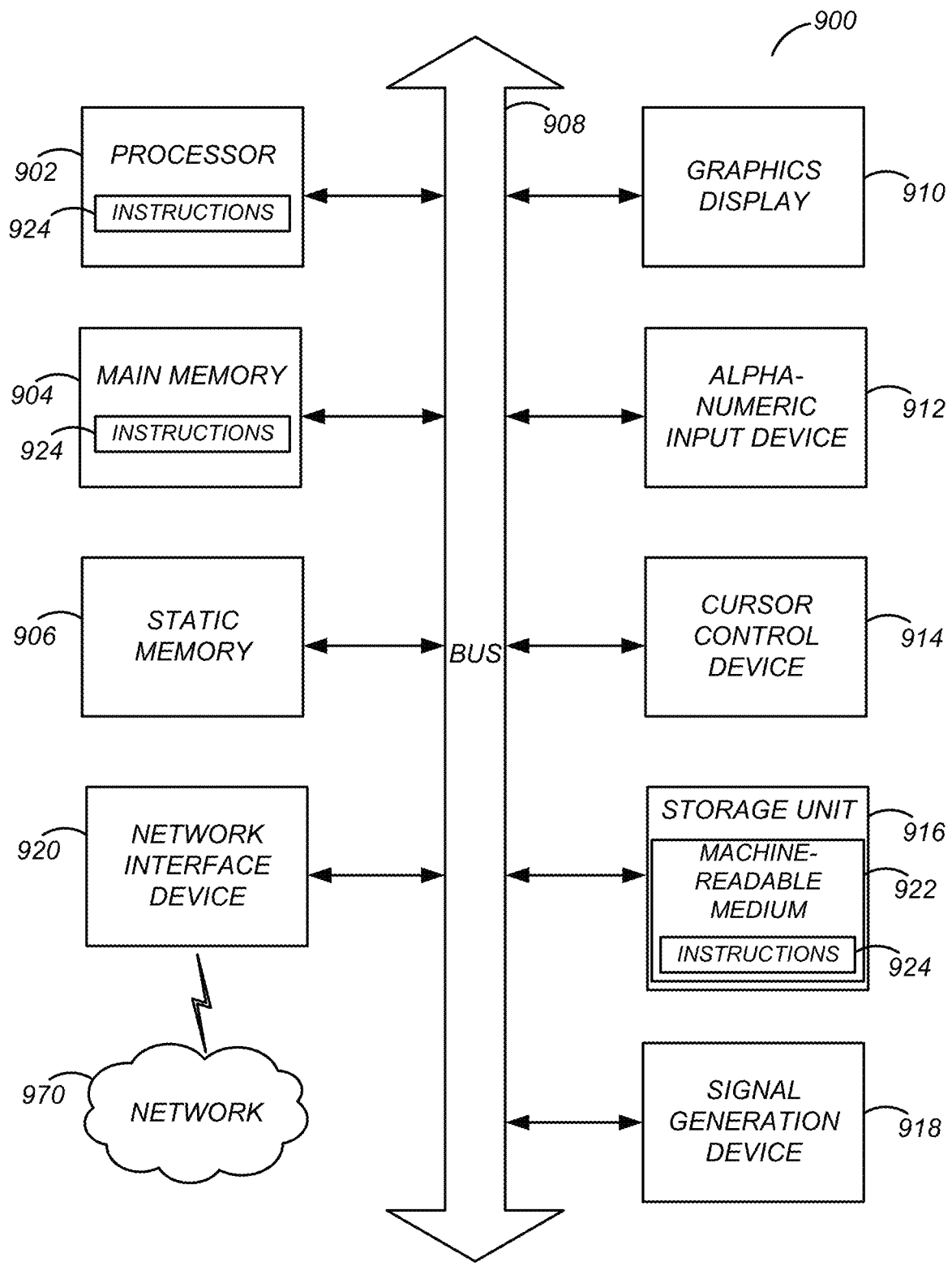
FIG. 9 is a block diagram illustrating components of an example machine able to read instructions from a machine-readable medium and execute them in a processor, according to one embodiment.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900. The computer system 900 can be used to execute instructions 924 (e.g., program code or software) for causing the machine to perform any one or more of the methodologies (or processes) described herein, including those associated, and described, with the components (or modules) of the visualization system 110 or the client device 120. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally one or more processors 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 902 may refer to a single processor or multiple processors. The computer system 900 also includes a main memory 904. The computer system may include a storage unit 916. The processor 902, memory 904, and the storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 970 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for radial map data visualization. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims, which make up part of this disclosure.

What is claimed is:

1. A computer-implemented method comprising:
   receiving a request for a radial map for a plurality of entities, the plurality of entities organized into a plurality of entity groups;
   retrieving, from one or more databases, data values for a plurality of parameters associated with each of the plurality of entities;
   identifying an outlier value of the retrieved data values based on one or more criteria relative to other retrieved data values;
   generating the radial map based on the retrieved data values, the radial map comprising a plurality of geometric shapes corresponding to the retrieved data values, including the outlier value, arranged in a plurality of radial columns thus defining a plurality of radial rows, each radial column representing a parameter of the plurality of parameters and each radial row representing an entity of the plurality of entities, wherein geometric shapes corresponding to each entity group are visually distinguished from geometric shapes corresponding to one or more adjacent entity groups in the radial map, and a geometric shape corresponding to the outlier value is visually distinguished from other ones of the geometric shapes; and
   providing the radial map for display on a visual interface.

2. The method of claim 1, further comprising:
   receiving a first indication of a first user interaction with a portion of the radial map;
   responsive to receiving the first indication, adjusting the radial map to highlight the portion of the radial map; and
   providing the adjusted radial map for display on the visual interface.

3. The method of claim 2, further comprising:
   receiving a second indication of a second user interaction with the highlighted portion of the adjusted radial map; and
   responsive to receiving the second indication, adjusting the visual interface to display additional data associated with the highlighted portion of the adjusted radial map.

4. The method of claim 2, further comprising:
   responsive to receiving the first indication, generating one or more additional geometric shapes representing parameter measures associated with the highlighted portion of the radial map;
   adjusting the radial map by replacing a first geometric shape in the highlighted portion of the radial map with the one or more additional geometric shapes; and
   providing the adjusted radial map for display on the visual interface.

5. The method of claim 4, wherein each of the one or more additional geometric shapes represents a parameter measure taken upon occurrence of a specified event or at a specified time.

6. The method of claim 4, wherein visual characteristics of the first geometric shape are based on an average outlier value for the parameter over one or more measured intervals.

7. The method of claim 1, further comprising:
   determining that a correlation exists between data values associated with two or more parameters measured for the plurality of entities;
   generating an additional radial map comprising a radial column representing a parameter of the two or more correlated parameters; and
   visually distinguishing a geometric shape corresponding to a value arranged in the radial column from other geometric shapes of the additional radial map.

8. The method of claim 7, further comprising:
   receiving an indication of a user interaction with a portion of the radial map;
   responsive to receiving the indication:

adjusting the radial map to highlight the portion of the radial map;

determining a portion of the additional radial map correlated with the portion of the radial map;

adjusting the additional radial map to highlight the correlated portion of the additional radial map; and providing the adjusted radial maps for display on the visual interface.

9. The method of claim 1, wherein identifying the outlier value of the data values based on the one or more criteria relative to other data values comprises:

comparing, based on a criterion of a threshold deviation, the outlier value for a parameter and a value of the parameter derived from a control group; and determining that the outlier value for the parameter deviates by more than the threshold deviation from the value of the parameter derived from the control group.

10. The method of claim 1, wherein each entity group is visually distinguishable from the one or more adjacent entity groups in the radial map based on a respective color, pattern, or line bordering between adjacent entity groups.

11. A computer system comprising:

one or more processors; and a non-transitory computer-readable storage medium comprising computer executable instructions that, when executed by the one or more processors, cause the computer system to:

receive a request for a radial map for a plurality of entities, the plurality of entities organized into a plurality of entity groups;

retrieve, from one or more databases, data values for a plurality of parameters associated with each of the plurality of entities;

identify an outlier value of the retrieved data values based on one or more criteria relative to other retrieved data values;

generate the radial map based on the retrieved data values, the radial map comprising a plurality of geometric shapes corresponding to the retrieved data values, including the outlier value, arranged in a plurality of radial columns thus defining a plurality of radial rows, each radial column representing a parameter of the plurality of parameters and each radial row representing an entity of the plurality of entities, wherein geometric shapes corresponding to each entity group are visually distinguished from geometric shapes corresponding to one or more adjacent entity groups in the radial map, and a geometric shape corresponding to the outlier value is visually distinguished from other ones of the geometric shapes; and provide the radial map for display on a visual interface.

12. The computer system of claim 11, wherein the instructions further cause the computer system to, responsive to receiving a first indication of a first user interaction with a portion of the radial map, adjust the radial map to highlight the portion of the radial map.

13. The computer system of claim 12, wherein the instructions further cause the computer system to, responsive to receiving a second indication of a second user interaction with the highlighted portion of the radial map, adjust a user interface to include additional data associated with the highlighted portion of the adjusted radial map.

14. The computer system of claim 12, wherein the instructions further cause the computer system to, responsive to receiving the first indication, adjust the radial map to include one or more additional geometric shapes representing one or more parameter measures associated with the highlighted portion of the radial map and wherein a first geometric shape in the highlighted portion of the radial map is replaced with the one or more additional geometric shapes.

15. The computer system of claim 14, wherein each of the one or more additional geometric shapes represents a parameter measure taken upon occurrence of a specified event or at a specified time.

16. The computer system of claim 15, wherein visual characteristics of the first geometric shape are based on an average outlier value for the parameter over one or more measured intervals.

17. The computer system of claim 11, wherein the instructions further cause the computer system to generate an additional radial map based on a determination of a correlation between data values associated with two or more parameters measured for the plurality of entities, wherein the additional radial map comprises a radial column representing a parameter of the two or more correlated parameters, and wherein a geometric shape corresponding to a value arranged in the radial column is visually distinguished from other geometric shapes of the additional radial map.

18. The computer system of claim 17, wherein the instructions further cause the computer system to, responsive to receiving an indication of a user interaction with a portion of the radial map, adjust a user interface to highlight the portion of the radial map and a portion of the additional radial map correlated with the portion of the radial map.

19. A non-transitory computer-readable storage medium storing computer-executable instructions that, in response to executing, cause a device comprising a processor to perform operations comprising:

receiving a request for a radial map for a plurality of entities, the plurality of entities organized into a plurality of entity groups;

retrieving, from one or more databases, data values for a plurality of parameters associated with each of the plurality of entities;

identifying an outlier value of the retrieved data values based on one or more criteria relative to other retrieved data values;

generating the radial map based on the retrieved data values, the radial map comprising a plurality of geometric shapes corresponding to the retrieved data values, comprising the outlier value, arranged in a plurality of radial columns thus defining a plurality of radial rows, each radial column representing a parameter of the plurality of parameters and each radial row representing an entity of the plurality of entities, wherein geometric shapes corresponding to each entity group are visually distinguished from geometric shapes corresponding to one or more adjacent entity groups in the radial map, and at least one of the geometric shapes corresponding to an outlier value is visually distinguished from other ones of the geometric shapes, and a geometric shape corresponding to the outlier value is visually distinguished from other ones of the geometric shapes; and providing the radial map for display on a visual interface.

* * * * *